United States Patent
Muramatsu et al.

(10) Patent No.: US 6,247,300 B1
(45) Date of Patent: Jun. 19, 2001

(54) GAS TURBINE ENGINE

(75) Inventors: Hironori Muramatsu; Eiichi Utsugi, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/507,887

(22) Filed: Feb. 22, 2000

(30) Foreign Application Priority Data

Feb. 26, 1999 (JP) .................................................. 11-096731

(51) Int. Cl.[7] .................................................. F02C 7/262
(52) U.S. Cl. .................................... 60/39.091; 60/39.33
(58) Field of Search .......................... 60/39.091, 39.281, 60/39.33, 39.821, 39.828

(56) References Cited

U.S. PATENT DOCUMENTS

| | | | |
|---|---|---|---|
| 4,368,617 | * | 1/1983 | Fukuda .............................. 60/39.141 |
| 5,168,699 | * | 12/1992 | McCarty et al. .................. 60/39.091 |
| 5,499,497 | * | 3/1996 | DeFreitas ............................ 60/39.06 |
| 5,551,227 | * | 9/1996 | Moulton et al. .................. 60/39.091 |

FOREIGN PATENT DOCUMENTS 7-243337    9/1995   (JP) .

* cited by examiner

*Primary Examiner*—Michael Koczo
(74) *Attorney, Agent, or Firm*—Arent Fox Kintner Plotkin & Kahn, PLLC

(57) ABSTRACT

A gas-turbine engine having means capable of determining the temperature inside a combustion chamber without mounting a special temperature sensor therein and of controlling the operation of the components according to the detected inside temperature of the combustion chamber, which is provided with means for measuring a resistance value of a glow plug driven with a constant current, means for measuring a flow rate of air supplied to the combustion chamber and means for determining an inside temperature of the combustion chamber by searching a specified temperature corresponding to a measured value of glow-plug-resistance and a measured air-flow-rate from a table holding therein resistance-temperature characteristic data of the glow plug predetermined for airflow rate as parameter.

3 Claims, 2 Drawing Sheets

GAS TURBINE ENGINE

BACKGROUND OF THE INVENTION

The present invention relates to a gas turbine engine of the type having means for determining the inside temperature of a combustion chamber and controlling various kinds of functions in accord with the determined inside temperature of the combustion chamber.

Generally, it is important to control a gas turbine engine based on an inside temperature of its combustion chamber.

For example, if the temperature inside the combustion rises higher than the nominal operating value, the emission becomes worse and, if the temperature is held at an extreme high temperature for a long time, the combustion chamber and the turbine may be damaged. Therefore, it is necessary to emergently stop the engine or restrict the fuel flow rate if the inside temperature of the combustion chamber abnormally increases.

If flameout (extinction) occurs during the operation of the engine, one is requested to immediately re-ignite the engine by using the ignition device. It is therefore desirable to reliably re-ignite the engine by early detecting the flameout state from a decrease in the inside-temperature of the combustion chamber.

However, an attempt of directly detecting the inside temperature of the combustion chamber by using a temperature sensor mounted therein may complicate the design of the engine and requires a severe layout of an especially high-heat-resistant temperature sensor.

Japanese Laid-Open Patent Publication No. 7-243337 discloses a method for indirectly determining an inside temperature of a combustion chamber from the number of revolutions of the engine at a compressor-inlet-temperature measured by a temperature sensor for the purpose of normalizing a preheating time of a glow plug.

This method, however, requires placing a high-heat-resistant temperature-sensor at a compressor portion inside the engine, complicating the layout design of the engine components.

Namely, the prior arts use special designed temperature sensors near or in the inside the combustion chamber to determine the inside-temperature necessary for controlling the engine operation, but they have a disadvantage of complicating the arrangement of components and the construction of the engine itself.

To solve the above-mentioned problem, the present invention was made to provide a gas turbine engine having means capable of controlling various kinds of operations in accord with an inside temperature of a combustion chamber, which can determine the inside temperature of the combustion chamber by using an existing heating coil of a glow plug as a heat-sensitive resistive element without placing any additional specially-designed temperature sensor in such a manner that a resistance-value of the glow plug driven with a constant current is detected by the heating coil and a temperature corresponding to an inside-temperature of the combustion chamber at the measured glow-plug resistance-value is determined from a table of preset glow-plug resistance-temperature characteristics predetermined for parameters being airflow or fuel-flow rate varying within a specified range.

PREFERRED EMBODIMENTS OF THE INVENTION

Figure 1:
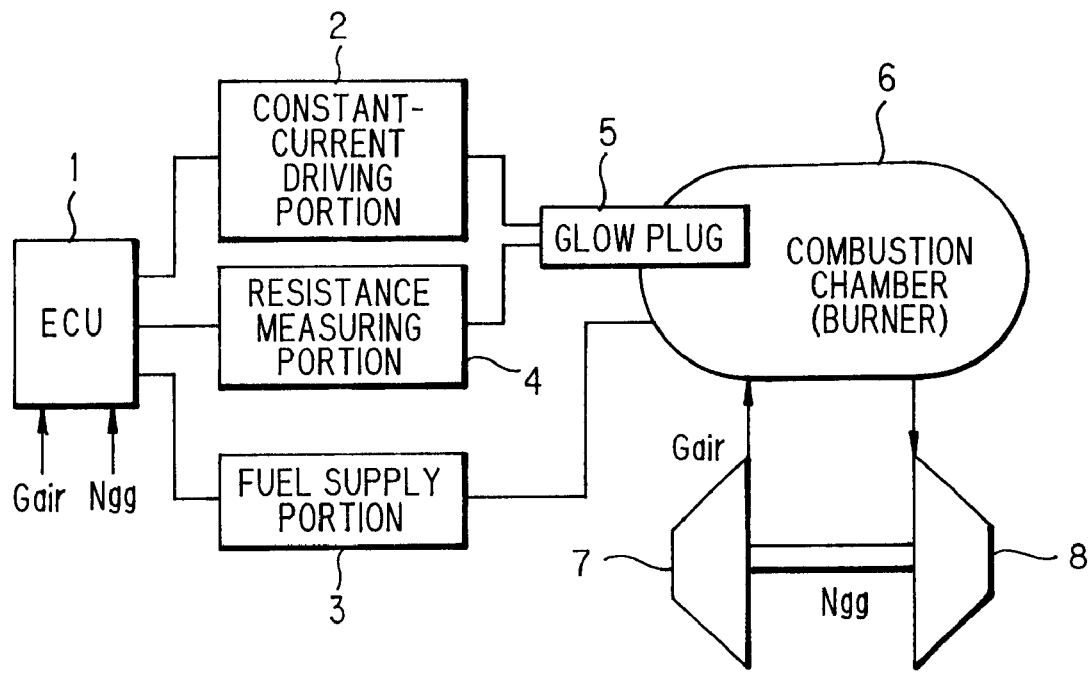
FIG. 1 is a block diagram of a control system of a gas turbine engine according to the present invention.

FIG. 1 is a block diagram of a control system of a gas turbine engine according to the present invention.

As shown in FIG. 1, the control system comprises an electronic control unit (ECU) 1 that controls a constant-current driving portion 2 for energizing a glow plug 5 with a constant current, a fuel supply portion 3 for supplying fuel at a specified flow-rate to a combustion chamber 6 and a resistance measuring portion 4 for measuring a resistance value of the glow plug 5. In FIG. 1, a compressor and a turbine are shown at 7 and 8, respectively.

The constant-current driving portion 2 energizes the glow plug with a large constant current of 8 to 10A at the time of igniting it and, thereafter, holds the glow plug as energized with a small constant current of about 10 mA for saving in power consumption.

The feature of driving the glow plug 5 with a specified constant current not only enables the control system to determine its resistance but also eliminates the possibility of breaking wiring of the plug by a large inrush current when energizing, allowing the glow plug to work steadily with no effect of harness size.

After ignition of the glow plug 5, the ECU 1 corrects a measured resistance value of the glow plug 5 from the resistance measuring portion 4 and a measured flow rate of air supplied from the compressor 5 into the combustion chamber 6 and determines an inside temperature of the combustion chamber at that time by referring to a table of resistance-temperature characteristic data of the glow plug for a specified range of variable airflow rate.

Figure 2:
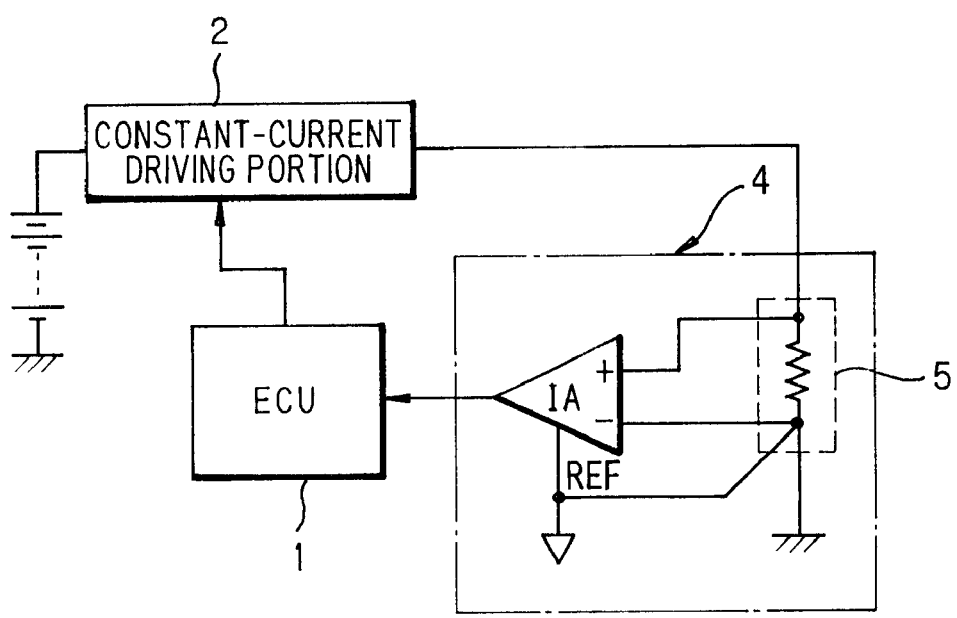
FIG. 2 is a practical circuit configuration of a resistance-measuring portion.

FIG. 2 is a practical circuit configuration of a resistance-measuring portion 4. This portion 4 is intended to detect an inside temperature of the combustion chamber 6 by using the glow plug itself as a heat-sensitive resistive element that varies its resistance as the temperature changes. A voltage across terminals of the glow plug being energized with a small constant current from the constant-current driving portion 2 after ignition is measured by a differential amplifier IA of the portion 4 and sent to the ECU 2 that in turn determines a glow-plug resistance value at that measured voltage value.

In the configuration of FIG. 2, the ECU can detect a breakage in the glow plug by the absence of the output-voltage of the differential amplifier IA.

The ECU 1 holds in its inner memory a table of the combustion-chamber's inside-temperature values with respect to the glow-plug resistance values over a specified range of variable airflow rates, which table was prepared based on actually measured data.

Figure 3:
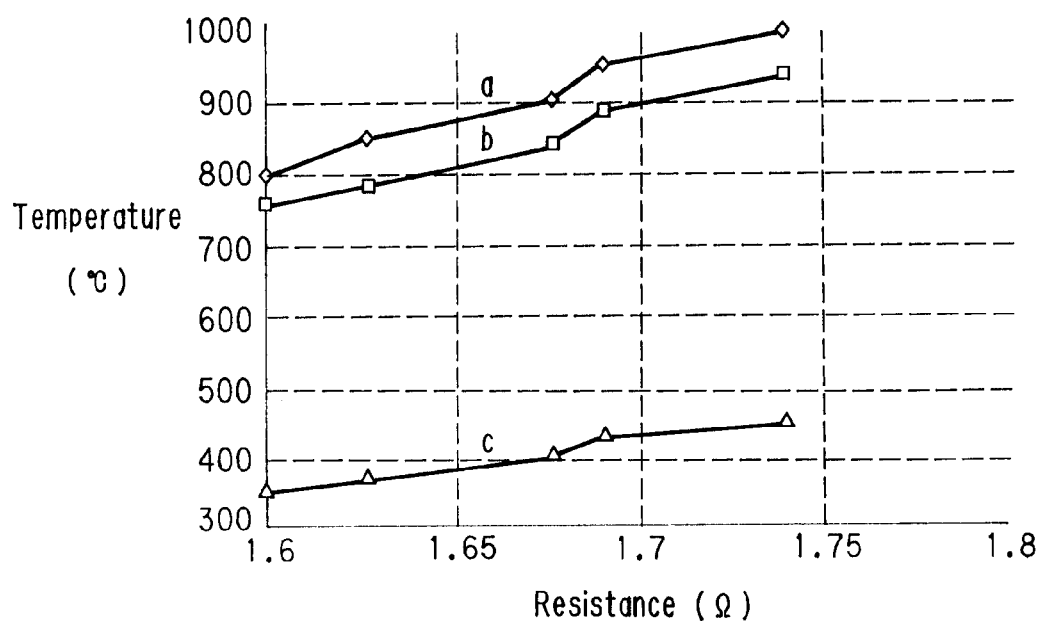
FIG. 3 shows actually measured characteristic curves representing "inside-temperature of a combustion chamber vs. resistance of a glow plug", which data was obtained at a constant airflow rate by changing the length of an intruded (into chamber) portion of a heating coil of a glow plug.

FIG. 3 shows actually measured characteristic data (curves) representing inside-temperature values of a combustion chamber 6 with respect to resistance values of a glow plug 5 when changing the length of an intruded (into chamber) portion of a glow-plug heating coil to a=2 mm, b=6 mm and c=8 mm at a constant airflow rate (Gair) of 0.5 g/s.

Figure 4:
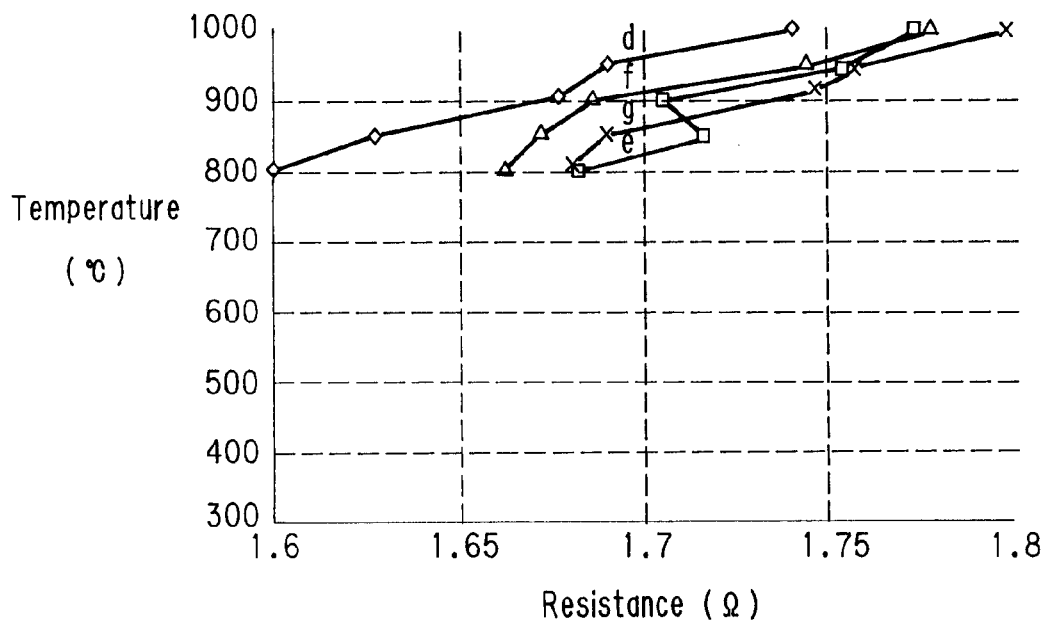
FIG. 4 shows actually measured characteristic curves representing "inside-temperature of a combustion chamber vs. resistance of a glow plug", which data was obtained by changing airflow rate at a fixed intrusion of the glow plug.

FIG. 4 shows actually measured characteristic data (curves) representing inside-temperature values of a combustion chamber with respect to resistance values of a glow plug 5 when changing airflow rate (Gair) to d=50.5 g/s, e=63.0 g/s, f=70.1 g/s and g=90.0 g/s respectively at a constant glow-plug intrusion length of 2 mm.

It is also possible to preset a table of actually measured characteristic data representing the relation between inside-temperature of the combustion chamber 6 and resistance of the glow plug 5, which was prepared by plotting actually measured data for a parameter Qf (flow rate) of fuel supplied from the fuel supply portion 3 to the combustion portion 6.

It is further possible to preset a table of actually measured characteristic data representing the relation between inside-temperature of the combustion chamber 6 and resistance of the glow plug 5, which was prepared by plotting actually measured data for both parameters Gair (airflow rate) and Qf (fuel-flow rate).

According to the present invention, it is possible to reliably detect an inside-temperature of the combustion chamber 6 by accurately measuring resistance of the glow plug 5 when and after ignition of the glow plug.

The ECU 1 can adequately regulate a current fuel flow rate in accord with a detected inside-temperature of the combustion chamber 6. If the measured temperature is abnormally high, it emergently stops the operation of the engine by shutting off the fuel supply.

The ECU 1 can also detect the flameout of the combustion chamber 6 by the fact that the number of revolutions Ngg of the engine falls down below a specified lower limit. In this case, the ECU 1 immediately causes the glow plug 5 to be re-ignited by supplying an increased constant current.

As described above, the gas turbine engine according to the present invention has means capable of controlling various kinds of operations in accord with an inside temperature of a combustion chamber and featured by the fact that the means can determine the inside temperature of the combustion chamber by using an existing heating coil of a glow plug as a heat-sensitive resistive element without placing any additional specially-designed temperature sensor in such a manner that a resistance-value of the glow plug driven with a constant current is detected by the heating coil and a temperature corresponding to an inside-temperature of the combustion chamber at the measured glow-plug resistance-value is determined from a table of preset glow-plug resistance-temperature characteristic data prepared by plotting actually measured data for a parameter of airflow or fuel-flow rate.

What is claimed is:

1. A gas turbine engine comprising a combustion chamber and a means capable of controlling various kinds of operations in accord with an inside temperature of said combustion chamber, which is provided with means for measuring a resistance value of a glow plug driven with a constant current, means for measuring a flow rate of air supplied to the combustion chamber and means for determining an inside temperature of the combustion chamber by searching a specified temperature corresponding to a measured value of glow plug resistance and a measured airflow rate from a table containing therein resistance-temperature characteristic data of the glow plug, predetermined for the airflow rate as a parameter.

2. A gas turbine engine comprising a combustion chamber and a means capable of controlling various kinds of operations in accord with an inside temperature of said combustion chamber, which is provided with means for measuring a resistance value of a glow plug drivable with a constant current, means for measuring a flow rate of fuel supplied to the combustion chamber and means for determining an inside temperature of the combustion chamber by searching a specified temperature corresponding to a measured value of glow-plug resistance and a measured fuel-flow-rate from a table containing therein resistance-temperature characteristic data of the glow plug, predetermined for the fuel flow-rate as a parameter.

3. A gas turbine engine as defined in any of claims 1 and 2, wherein the number of revolutions of the engine measured and flameout of the combustion chamber is detected based on the measured number of revolutions and the determined inside-temperature of the combustion chamber.

* * * * *